United States Patent [19]

Okamoto et al.

[11] 4,061,907
[45] Dec. 6, 1977

[54] INTERPOLATOR FOR A NUMERICALLY CONTROLLED MACHINE WITH STEP SIZE SELECTED IN RESPONSE TO FEED RATE

[75] Inventors: Kiyokazu Okamoto; Hitoshi Hayashi, both of Tokyo, Japan

[73] Assignee: Nippon Electric Company, Ltd., Tokyo, Japan

[21] Appl. No.: 706,322

[22] Filed: July 19, 1976

[30] Foreign Application Priority Data

July 17, 1975 Japan .................................... 50-87710

[51] Int. Cl.$^2$ ............................................ G06F 15/46
[52] U.S. Cl. ..................................... 364/718; 318/573
[58] Field of Search ........................... 235/151.11, 152

[56] References Cited

U.S. PATENT DOCUMENTS

3,590,226  6/1971  Lane ................................. 235/151.11

*Primary Examiner*—Eugene G. Botz
*Attorney, Agent, or Firm*—Sughrue, Rothwell, Mion, Zinn and Macpeak

[57] ABSTRACT

Input signals supplied for each block to an interpolator for a numerically controlled machine comprise displacement signals representative of conventional displacement data in terms of a conventional step size and a feed rate signal representative of a feed rate which, in turn, defines a conventional pulse distribution rate. The interpolator selects, in response to the feed rate signal, a working step size to be an integral multiple or an integral submultiple (exclusive of unity) of the conventional one, derives working displacement data and a working pulse distribution rate by dividing the conventional ones by the multiple or submultiple, and carries out pulse distribution in a conventional manner but by the use of the working displacement data and feed rate to produce those distribution signals at the working pulse distribution rate which make servos feed a machine tool relative to a workpiece with the working step size and at the feed rate. The input signal may include a signal indicative of the working step size.

4 Claims, 15 Drawing Figures

INTERPOLATOR FOR A NUMERICALLY CONTROLLED MACHINE WITH STEP SIZE SELECTED IN RESPONSE TO FEED RATE

BACKGROUND OF THE INVENTION

This invention relates to a digital interpolator for a numerically controlled machine.

Various interpolators are already known as will be illustrated hereunder with reference to some of the figures of the accompanying drawing. The interpolators, however, are still defective in some respects. For example, the interpolators are incapable of making the numerically controlled machines operate at considerably high speeds, with sufficiently high precisions, and with satisfactorily excellent results of finishing. The requirement for the high speed has been contradictory to the requirements for the precision and good results. For a numerically controlled machine used in combination with an electronic digital computer, an additional interpolator has been indispensable in order to attain the high speed. The additional hardware raises the cost and nevertheless adversely affects the precision and the results of finish.

SUMMARY OF THE INVENTION

It is therefore an object of the present invention to provide an interpolator for making a numerically controlled machine operate at a considerably high speed, with a satisfactorily high precision, and with sufficiently excellent results of finishing.

It is another object of this invention to provide an interpolator of the type described at reasonable cost.

Responsive to a set of input signals for each block, an interpolator for a numerically controlled machine produces a plurality of distribution signals. The input signals comprise a set of displacement signals and a feed rate signal. The displacement signals are representative of conventional displacement data specifying the block in terms of a conventional step size. The feed rate signal is representative of a feed rate which defines, in turn, a conventional pulse distribution rate. The distribution signals are representative of those commanded positions substantially along the block which the numerically controlled machine should follow at the feed rate. In accordance with this invention, the interpolator comprises step size means responsive to the feed rate signal for selecting a working step size to produce a step size signal representative of the working step size and working data means responsive to the step size signal and the input signals for producing working signals representative of working displacement data and a working pulse distribution rate. The ratio of the working displacement data to the conventional ones and the ratio of the working pulse distribution rate to the conventional one are substantially equal to the ratio of the conventional step size to the working step size. The interpolator further comprises pulse distribution means responsive to the working signals for producing the distribution signals at the working pulse distribution rate. The distribution signals are now representative of the commanded positions in terms of the working step size.

Instead of the feed rate signal, use may be made in order to derive the working step size of a step size signal that represents the working step size and is specifically included in the input signals.

DESCRIPTION OF THE PREFERRED EMBODIMENTS

Figure 1:
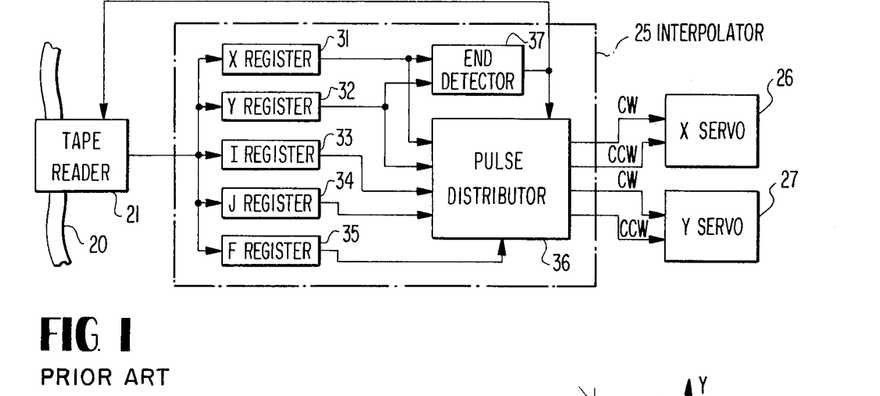
FIG. 1 is a block diagram of those principal portions of a conventional numerically controlled machine which have a direct connection with the present invention.
Figure 2:
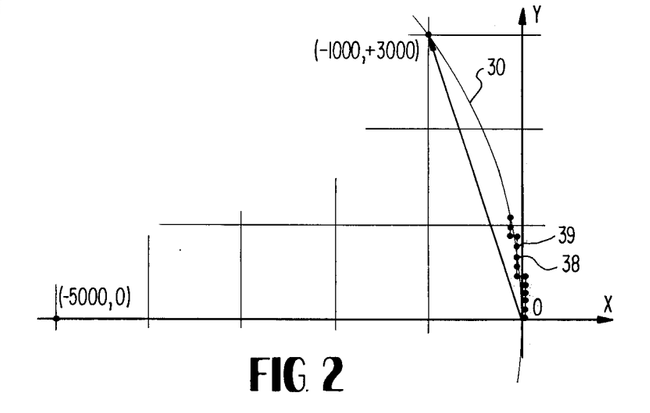
FIG. 2 shows in general a block to be interpolated by an interpolator of a numerically controlled machine and commanded positions to be followed by the machine.

Referring to FIGS. 1 and 2, a first example of conventional numerically controlled machines will be described at first for a better understanding of the present invention. Data for driving the machine are recorded on a recording medium as, for example, by punching a paper tape 20. The machine comprises a data reader, such as a tape reader 21, an interpolator 25, and servo systems. In the example being illustrated, only X and Y servos 26 and 27 are depicted for use in feeding a machine tool (not shown) relative to a workpiece (not shown) along an X-Y plane (FIG. 2). Supplied with a data request signal at the beginning of the machine operation, the tape reader 21 reads a set of data from the tape 20 and supplies the read-out data to the interpolator 25. The supplied data are for making the interpolator 25 supply, in turn, successive distribution pulses CW and CCW to the servos 26 and 27 to make the latter feed the machine tool relative to the workpiece from a starting point (0, 0) to an end point, such as (−1000, +3000), of an interval or block along a predetermined path or line 30 and are consequently called a set of block data. As shown, the line 30 may not necessarily be a straight line.

Generally speaking, a set of block data comprises first or displacement data and a second or feed rate datum F. The first data comprise position data representative of difference in coordinates of the end point relative to the starting point, as X −1000 and Y +3000. The first data further comprise curvature data for identifying a predetermined line, such as 30, along which interpolation should be carried through by the interpolator 25. For example, G00, G01, and G02 specify a position (end point alone), rectilinear interpolation (zero curvature), and counterclockwise circular interpolation, respectively. When the interpolation should proceed along a circular arc, the curvature data further comprise data representative of the center of the circle relative to the starting point, as I −5000 and J +0. The coordinates are given in terms of a unit length, which may be 0.01 mm or 10 microns. The feed rate datum F is indicative of a relative feed speed between the machine tool and the workpiece and consequently a rate or speed of the interpolation and may be given as, for example, F 600, which indicates that the relative speed is 600 mm/min. When the machine tool is movable relative to a relating workpiece as in a lathe, the number indicates the axial speed per revolution, as 6.00 mm/rev. In general, the speed is not renewed until a new feed rate datum is given by the tape 20 even though the first data may be renewed for every block. It is to be noted that the line 30 may be three dimensional with Z and K data included in the first date, that a circular arc may generally be substituted for any other curves, that the positions may be given by polar, cylindrical, or other coordinates, and that the machine may be an automatic drafting machine or the like although the expressions "machine tool" and "workpiece" are used herein.

Referring more particularly to FIGS. 1 and 2, an interpolator 25 for carrying out circular interpolation comprises X, Y, I, J, and F registers 31, 32, 33, 34, and 35 for storing the read-out X, Y, I, J, and F data, a pulse distributor 36 responsive to the data stored in the registers 31 through 35 for successively supplying distribution pulses CW and CCW to the X and Y servos 26 and 27, and an end detector 37 responsive to the X and Y data for supplying a new data request signal to the tape reader 21 when the end point is reached. The new data request signal is supplied also to the pulse distributor 36 to stop its operation insofar as the present block is concerned. It is to be understood that the feedback from a moving portion (not shown) driven by the servos 26 and 27 to feed the machine tool, the workpiece, or both is not shown because this invention relates to an interpolator, such as indicated at 25. The machine tool is fed relative to the workpiece to faithfully follow the points or positions successively commanded by the distribution pulses as exemplified in FIG. 2. In response to the new data request signal, the tape reader 21 supplies newly read-out data to the interpolator 25. If interpolation is again necessary for the new data, the interpolator 25 produces distribution pulses for a new block starting from the previous end point to a new end point designated by the new X and Y data representative of the coordinates of the new end point relative to the new starting point along, most likely, a new circle whose center is indicated by the new I and J data again relative to the new starting point.

In connection with the example illustrated with reference to FIGS. 1 and 2, it is mentioned here that a conventional interpolator 25 carries out, in response to each set of the block data, pulse distribution a plurality of times to produce the distribution pulses CW and CCW several times, equal in number of frequency to the plurality, during interpolation of a block. Each distribution pulse CW or CCW specifies a difference in one of the abscissa and ordinate between a previous commanded position and a next following commanded position exemplified in FIG. 2 by each pair of dots, such as 38 and 39, and makes a pertinent one of the servos 26 and 27 feed the machine tool relative to the workpiece between the two adjacent commanded positions parallel to the relevant coordinate axis X or Y. For example, a counterclockwise distribution pulse CCW for the X servo 26 carries out the relative feed of the machine tool in the direction and sense of decreasing the abscissa. The difference in one of the coordinates of the adjacent commanded positions has been given in terms of the unit length. In other words, a step size, namely, the difference in each of the coordinates has been decided to be equal to the unit length. It has therefore been necessary, in order to interpolate a block given by X −1000 and Y +3000 at a rate of 600mm/min as exemplified by the X, Y, and F data hereinabove, that the pulse distribution should be carried out 4000 times at a rate of 600 × $10^2$ times per minute or 1.00 × $10^3$ times per second or, again, 1.00 kHz.

Figure 3:
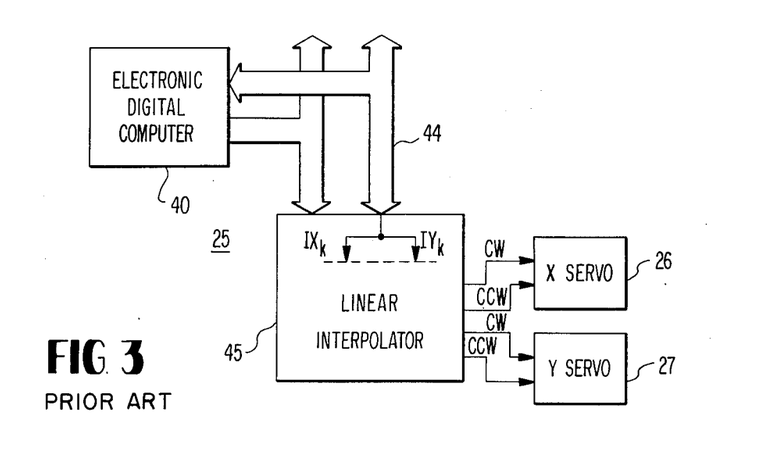
FIG. 3 is a block diagram of principal portions of another conventional numerically controlled machine for use in combination with an electronic digital computer.
Figure 4:
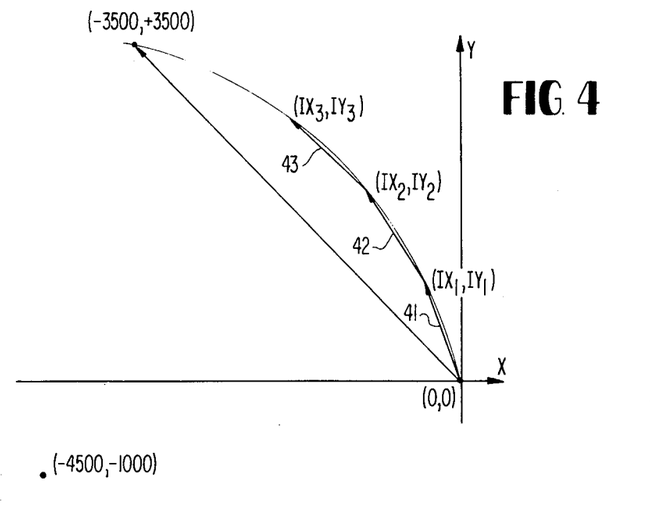
FIG. 4 shows a block to be interpolated by a general interpolator for a numerically controlled machine and several line segments decided as a result of coarse interpolation carried out by the computer.
Figure 5:
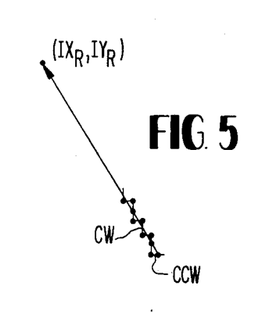
FIG. 5 illustrates one of the line segments on an enlarged scale together with fine interpolation carried out by an additional interpolator comprised in the machine depicted in FIG. 3.

Next referring to FIGS. 3 through 5, a second example of conventional numerically controlled machine is for use in combination with an electronic computer 40. Responsive to each set of the block data preliminarily supplied to the computer 40 and stored therein, the computer 40 operates as a first portion of the interpolator 25 illustrated with reference to FIGS. 1 and 2 and carries out coarse interpolation by successively calculating coarse data or line segment data $IX_k$ and $IY_k$ (FIGS. 3 through 5) representative of line segments 41, 42, ... when $k = 1, 2$, and so on. Supplied with the calculated coarse data through an input-output bus 44, a linear interpolator 45 serves as a second or additional portion of the interpolator 25 and carries out fine interpolation by calculating the distribution data CW and CCW (FIGS. 3 and 5) and supplying the same to the X and Y servos 26 and 27. Use of the linear interpolator 45 is to raise the speed of operation as will be described hereunder. The linear interpolator 45, however, is for the line segments 41, 42, and others as illustrated in FIG. 5 and not for the line 30. The precision is therefore lowered at the cost of the speed.

Figure 6:
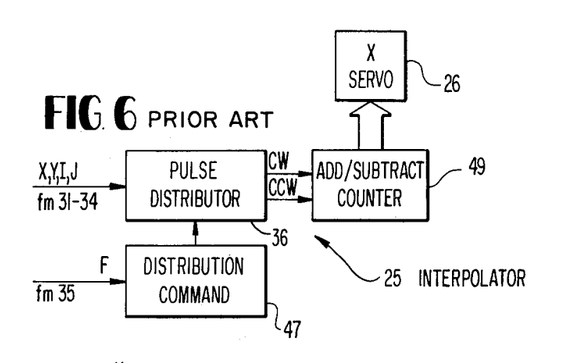
FIG. 6 is a block diagram of principal portions of still another conventional numerically controlled machine.

Referring to FIG. 6, a third example of conventional numerically controlled machines comprises an interpolator 25 comprising, in turn, random logics (not shown) known in the art. The block diagram is quite similar to that shown in FIG. 1. A distribution command unit 47 is, however, depicted. Responsive to the feed rate datum F supplied from the F register 35, the command unit 47 supplies a sequence of distribution command pulses to the pulse distributor 36 which produces the distribution pulses CW and CCW, one for each command pulse. Furthermore, an add/subtract counter 49 is depicted although for only one of the coordinate axes, such as for the X axis. The counter 49 carries out addition and subtraction according as the supplied distribution pulse is for a clockwise (CW) step and a counterclockwise (CCW) step, respectively, and supplies the X servo 26 with a position command signal which is renewed by the addition or subtraction and remains unchanged when no distribution pulse is produced as a result of the pulse distribution.

In connection with the servo systems, such as 26 and 27, it is to be pointed out at first that their frequency response characteristics are low-pass (high-rejection) as are known in the art. When supplied with the distribution pulses or data at a relatively slow rate of pulse distribution, the servo systems carry out most or all of their following operation in response to each of the distribution data before the commanded position is renewed by a next following distribution datum. The following operation is thus rendered stepwise. As the commanded positions are renewed at a faster rate, the servo systems operate more smoothly with the following errors decreasing accordingly. When the rate of renewal of the commanded positions reaches a certain upper limit, the operation becomes completely smooth. Although dependent on performances of the servo systems, the upper limit is 1 kHz or less when the performance is relatively excellent. Summarizing, it is necessary for smooth operation of the servo systems that the distribution data or the step sizes should be small when the distribution data are supplied to the servo systems at such a long interval as to give the servo systems a tendency towards the stepwise response and that the distribution data or the step size need not be small when supplied to the servo systems at such a short interval as to render the response of the servo systems continuous.

Secondly, it should be pointed out that a numerically controlled machine is required to operate at a faster speed, with a higher precision, and with better results of finishing as described in the preamble of the instant specification. The higher precision and better results of finish are known to be dependent on the precision of the interpolator, such as 25 or 40 and 45, if a numerically controlled machine has a given following performance. In other words, the higher precision and better finish results are available with greater ease if the interpolator used gives higher precision, namely, produces smaller distribution data at a shorter interval. On the other hand, the most important factor for the following operation of a faster speed is to place the interpolator in operation at a faster rate or speed. Otherwise stated, it is necessary to achieve a larger product of the step size multiplied by the interval for the distribution data, namely, the interval of pulse distribution.

When the step size should be only one micron and when the speed of following or the relative speed of the machine tool should amount to 12 m/min or $200 \times 10^3$ micron/sec, the interval of pulse distribution should be as small as five microseconds. Inasmuch as it is not seldom that the maximum value of the block data is $\pm 100$ meters or $1 \times 10^8$ microns (as for the radius of curvature), twenty-seven bits are necessary when one bit is assigned to the step size of one micron. With the calculation carried out per byte, the precision of four bytes is indispensable even for the algebraic addition. For an electronic digital computer, such as 40, of the minicomputer class wherein the data handled are basically of a sixteen-bit length, the number of steps required to carry through a program for pulse distribution is from about two scores to about 160. The computer of the type specified operates at a cycle time of from 0.5 microsecond to 2 microseconds in general. The interval of pulse distribution is therefore from about twenty microseconds to about three hundred microseconds, considerably longer than the above-mentioned five-microsecond interval, even under the assumption such that the computer carries out the pulse distribution program alone. This is the reason why the linear interpolator 45 is used in a conventional interpolator as described hereinabove at the cost of the precision.

Table

| Values given by the F data | Step sizes D (microns) |
|---|---|
| 4800 or more | 80 |
| 1200 to 4799 | 20 |
| 600 to 1199 | 10 |
| 300 to 599 | 5 |
| 150 to 299 | 2 |
| 149 or less | 1 |

In accordance with the present invention, the step size of the following operation for a block is determined or selected with reference to the feed rate F given by the feed rate signal comprised by the block or input signals in consideration of the fact that the speed of interpolation is linearly proportional to the product of the step size and the interval of pulse distribution as described hereinabove. The step size thus decided may be called a working step size D and valid for a plurality of blocks. For example, the step sizes D are selected for several ranges of the F data as given in Table hereinbefore. Instead of using the F data in preliminarily selecting the working step size D in compliance with a predetermined relation, such as shown in the Table, the step size may be designated by a step size signal included in a set of the input signals. In any event, it is preferred that the selected step size D be an integral multiple of the conventional step size (usually 10 microns) when the feed rate is not smaller than a predetermined value (for example, F 600) and be an integral submultiple (exclusive of unity) of the conventional one when the feed rate is smaller than the predetermined value.

In order to carry out the interpolation with the step size D selected for one or more blocks, use is made in accordance with this invention of modified or working position data given by integral quotients of the conventional position data divided by the working step size D. For instance, let a conventional X datum be $+7250$ in terms of 10 microns. With a conventional interpolator, such as those illustrated with reference to FIGS. 1, 3, and 6, the pulse distribution is carried out 7250 times insofar as the following operation along the X axis is concerned, to supply the servo systems with the distribution pulses or data specifying renewal of the commanded positions by a fixed step size, usually 10 microns. If the step size is selected to be 50 microns according to an example of this invention (not given in the above-shown Table but cited for more convenience of calculation in decimal numbers), use is made of a working X datum or an X' datum of 1450 which is obtained by preliminarily dividing 7250 by 5, namely, by the integral multiple for deriving the working step size D from the conventional one. Responsive to the X' datum, an interpolator according to this invention carries out pulse distribution 1450 times and supplies the servo systems with distribution data, each indicative of renewal of the commanded position by one selected step size D or 50 microns. Inasmuch as it is necessary to carry out the pulse distribution 1450 times with an interpolator according to this invention during the time that a conventional interpolator does 7250 times, the feed rate F should also be inversely proportional to the integral multiple or submultiple. For example, let the second datum be F 4500. Inasmuch as the speed of the relative feed is 4500 mm/min or $7.5 \times 10^4$ micron/sec, the frequency of the conventional pulse distribution is $7.5 \times 10^4$ micron/sec divided by the conventional step size of 10 microns, namely, 75 kHz, whereas the frequency for this invention is 75 kHz divided by 5, the integral multiple for the example being illustrated, and is only 15 kHz. In order to specify this latter frequency for an interpolator according to this invention, it is thus necessary to preliminarily deal with or divide the F datum by the integral multiple or submultiple. When the displacement data are given as exemplified hereinabove in terms of 10 microns and when the codes recorded on the recording medium 20 for the block data are in binary decimal, the interpolator may convert the binary decimal codes into pure binary codes. Under the circumstances, the preliminary processing is carried out by dividing the displacement and feed rate data by the multiples 8, 2, 1, ½, 1/5, and 1/10 for the working step sizes D of 80, 20, 10, 5, 2, and 1 micron given in the Table, namely, by multiplying the binary codes by ⅛, ½, 1, 2, 5 = 1 + 4, and 10 = 2 + 8. This is quite readily carried out as will be obvious to those versed in binary numbers.

Figure 7:
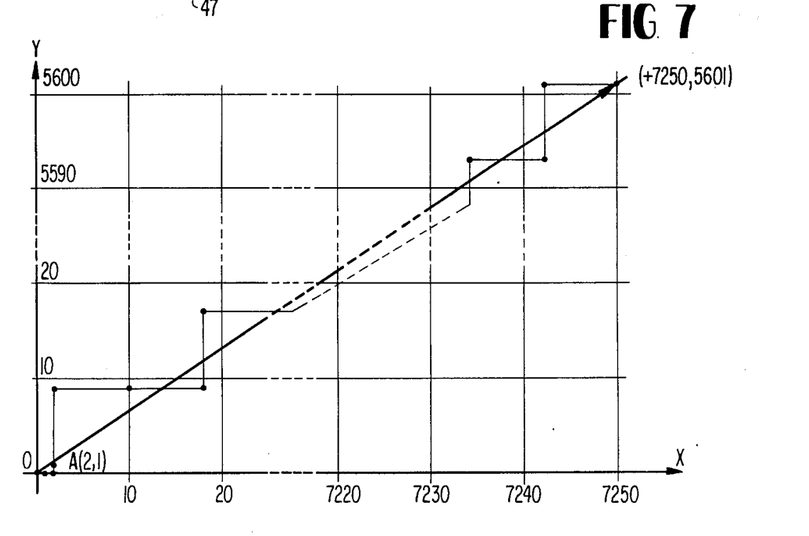
FIG. 7 shows the following operation of a numerically controlled machine comprising an interpolator according to this invention.

Referring now to FIG. 7, it may occur during the preliminary operation for an interpolator according to the present invention of dividing the conventional block data by the multiple or multiples that the data are indivisible and are given by integral quotients plus remainders or residuals which are fractions of the multiples. For example, let an X datum and the working step size D be +7250 and 80 microns. Inasmuch as 7250 is equal to 906 × 8 + 2, use is made of 906 as the X' datum to carry out the pulse distribution 906 times with the working step size D of 80 microns. In the meantime, the pulse distribution is carried out twice with the conventional step size of 10 microns. In FIG. 7, the latter pulse distribution of the second or auxiliary process is depicted at the beginning of the following operation for the present block together with the pulse distribution of the 10-micron step once for the Y datum between a starting point (0, 0) and a point A (+2, +1) for a Y datum of +5601 that is equal to 700 × 8 + 1. It is readily possible to detect the residual when the block data are given by binary codes and when the multiplication for deriving the working displacement data is by one over a power to 2 as given in the Table. On multiplying a datum by ⅛, the residual is given in a binary number by three less significant digits. Pulse distribution of the auxiliary process should therefore be carried out at the beginning of operation until the three less significant digits become 000. When the block data are to be multiplied by ½, the auxiliary pulse distribution should be carried out until the least significant digit becomes 0. These digits may temporarily be stored in a memory (not shown in FIG. 7) to carry out the auxiliary pulse distribution at any time during interpolation for the block concerned. Although the residual must be dealt with for the position data X, Y, and Z, it is possible to neglect the residual or residuals for the curvature data I, J, and K because the residuals give rise only to an error smaller than 10 microns as regards the pulse distribution. Incidentally, it does not seriously matter even if the pulse distribution for the residuals be carried out in the X direction at first and subsequently in the Y direction.

Figures 8, 9:
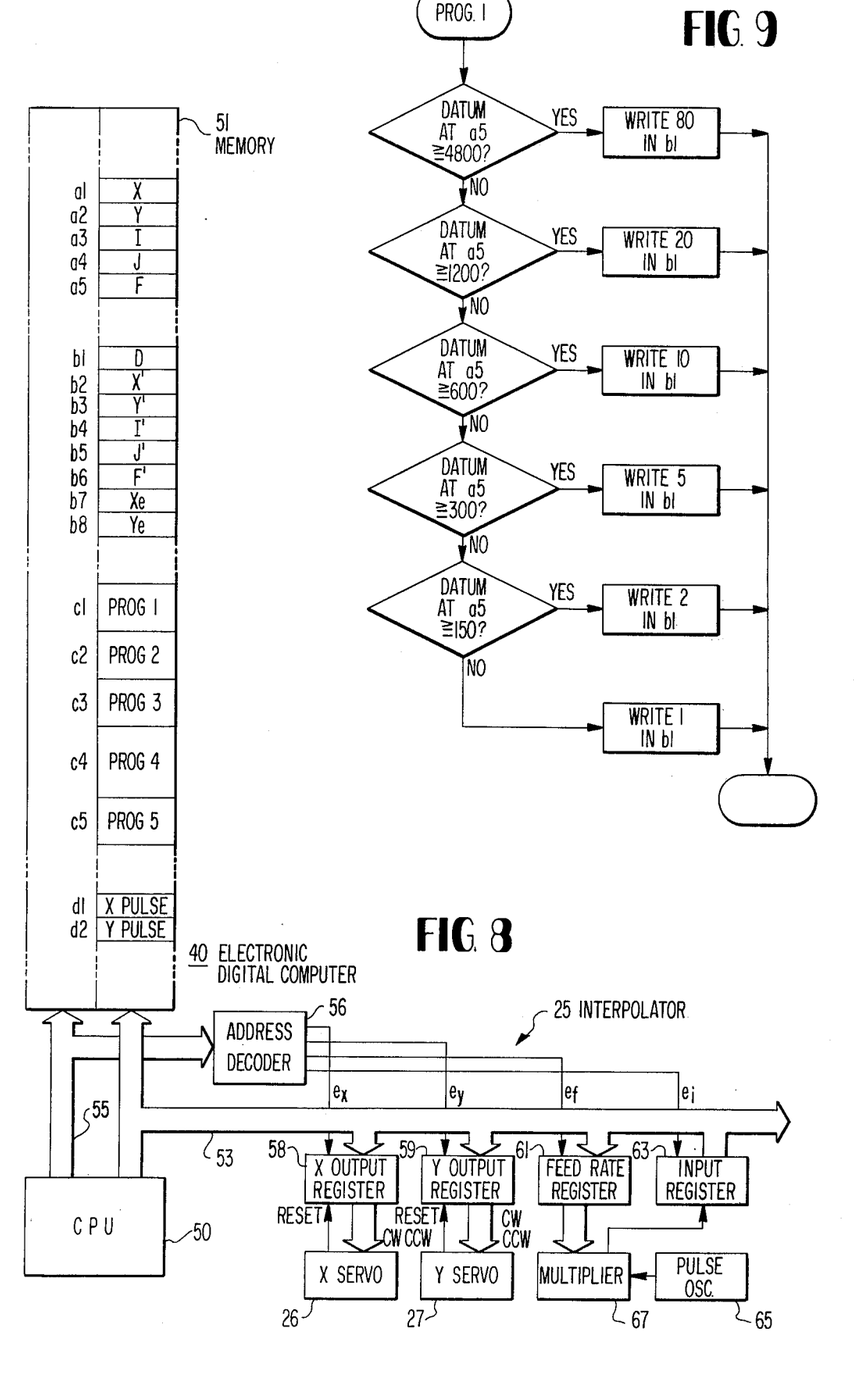
FIG. 8 is a block diagram of principal portions of a numerically controlled machine comprising an interpolator according to a first embodiment of this invention.
FIGS. 9 through 13 are flow charts illustrative of programs executed by an interpolator according to the first embodiment.

Next referring to FIGS. 8 and 9, an interpolator according to a first embodiment of this invention comprises facilities in an electronic digital computer 40, which may be a minicomputer, comprising a central processing unit 50 and a memory 51 having, in turn, addresses $a1, \ldots, b1, b2, b3, b4, b5, b6, b7, b8, c1, \ldots, d1, d2$, and others. In response to a data store program, the central processor 50 stores in a known manner the numerical values following the respective letters X, Y, I, J, and F together with the signs in the addresses $a1, a2, a3, a4$, and $a5$, respectively, and a step size selection program PROG1, a fraction central processor program PROG2, a preliminary processing program PROG3, a pulse F' and output program PROG4, and a feed rate program PROG5 in the addresses starting with the addresses $c1, c2, c3, c4$, and $c5$, respectively. Responsive to the step size selection program PROG1, the central processor 50 checks the F datum stored in the address $a5$, selects a working step size D with reference to a given relation, such as the above-referenced Table, and stores the working step size D in the address $b1$. FIG. 9 shows a flow chart for the step size selection program PROG1. It may be mentioned here that a set of input signals comprising a set of displacement signals or position and curvature signals and a second or feed rate signal is supplied to the memory 51 along with address signals therefor on storing the respective data X, Y, I, J, and F in the pertinent addresses, that a feed rate signal is supplied from the memory 51 through a data bus 53 on selecting the working step size D, and that a step size signal is supplied to the memory 51 through the data bus 53 on storing the selected step size D in the address $b1$.

Figure 10:
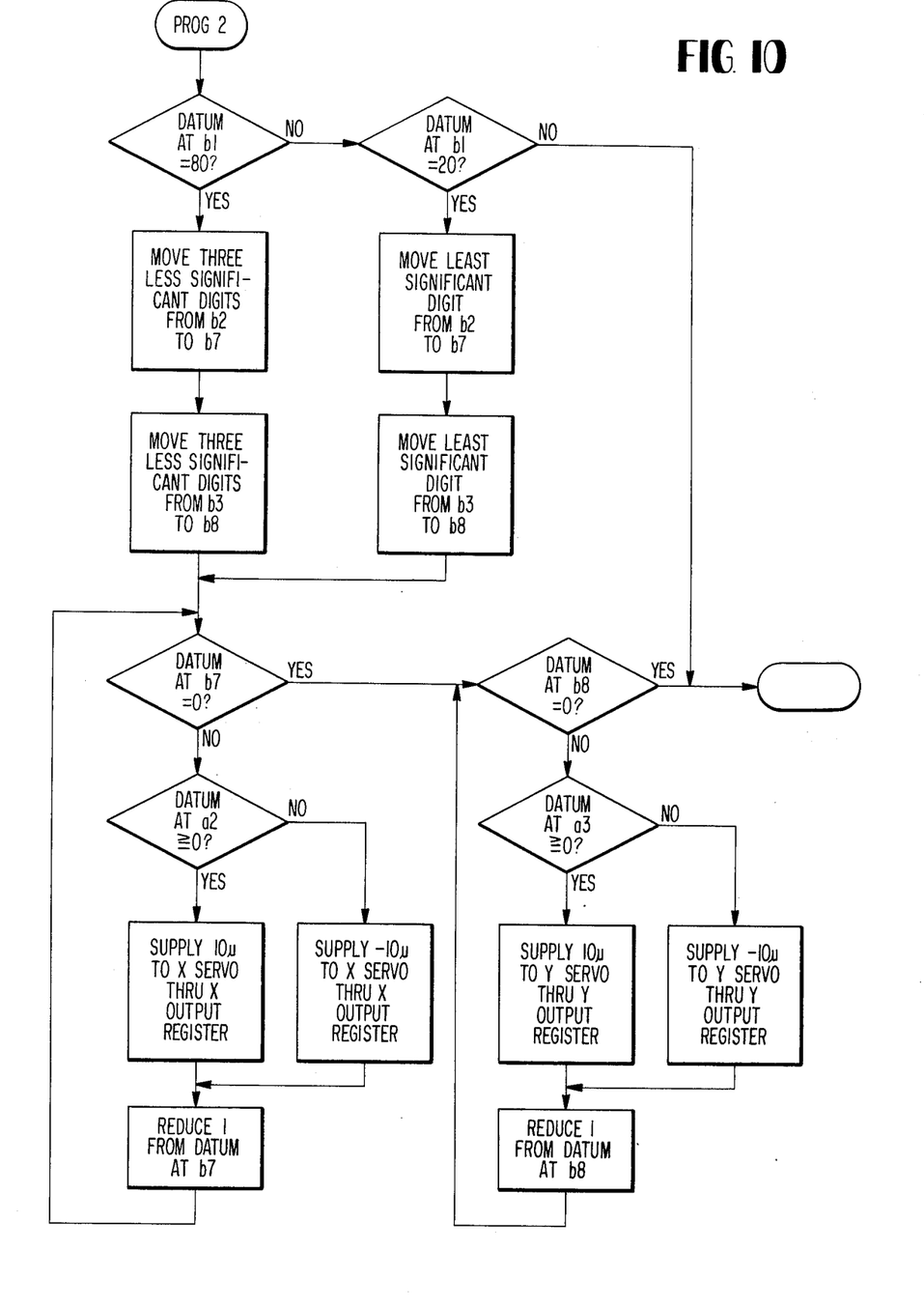

Referring again to FIG. 8 and afresh to FIG. 10, the computer 40 further comprises an address bus 55 and an address decoder 56 for decoding address codes supplied thereto from the central processor 50 through the address bus 55 to produce write-in signals $e_x$, $e_y$, and $e_f$ and a read-out signal $e_i$. The computer 40 still further comprises an X and a Y output register 58 and 59 responsive to the write-in signals $e_x$ and $e_y$ therefor for receiving data signals supplied thereto from the memory 51 by the central processor 50 through the data bus 53. Inasmuch as these elements are known in the computer art, description of their details is believed to be unnecessary. Responsive to the fraction processing program PROG2, the central processor 50 moves the three less significant digits of the X and Y data from the addresses $a2$ and $a3$ to the addresses $b7$ and $b8$ as residual data $X_e$ and $Y_e$ when the working step size D is 80 microns. When the working step size D is 20 microns, the residual data $X_e$ and $Y_e$ are given by the least significant digit of each of the X and Y data stored in the addresses $a2$ and $a3$. It is to be pointed out here that the residual values $X_e$ and $Y_e$ are always positive. These steps of the fraction processing program PROG2 are illustrated in an upper half of FIG. 10. Subsequently, the central processor 50 makes the address decoder 56 produce the write-in signal $e_x$ to let the X output register 58 receive the X residual datum $X_e$ from the data bus 53 one by one together with the sign of the X datum stored in the address $a2$. In the meanwhile, the X output register 58 supplies a distribution signal to the X servo 26 to feed the machine tool by the conventional step size of 10 microns relative to the workpiece in the sense specified by the sign of the X datum. The X output register 58 is reset from the X servo 26. The residual datum $X_e$ in the address $b7$ is reduced by one for each instance of the pulse distribution in the X direction until the residual datum $X_e$ eventually becomes zero. Thereafter, the central processor 50 similarly deals with the fraction or residual $Y_e$, if any, of the Y datum. These latter steps are illustrated in a lower half of FIG. 10.

Figures 11, 12:
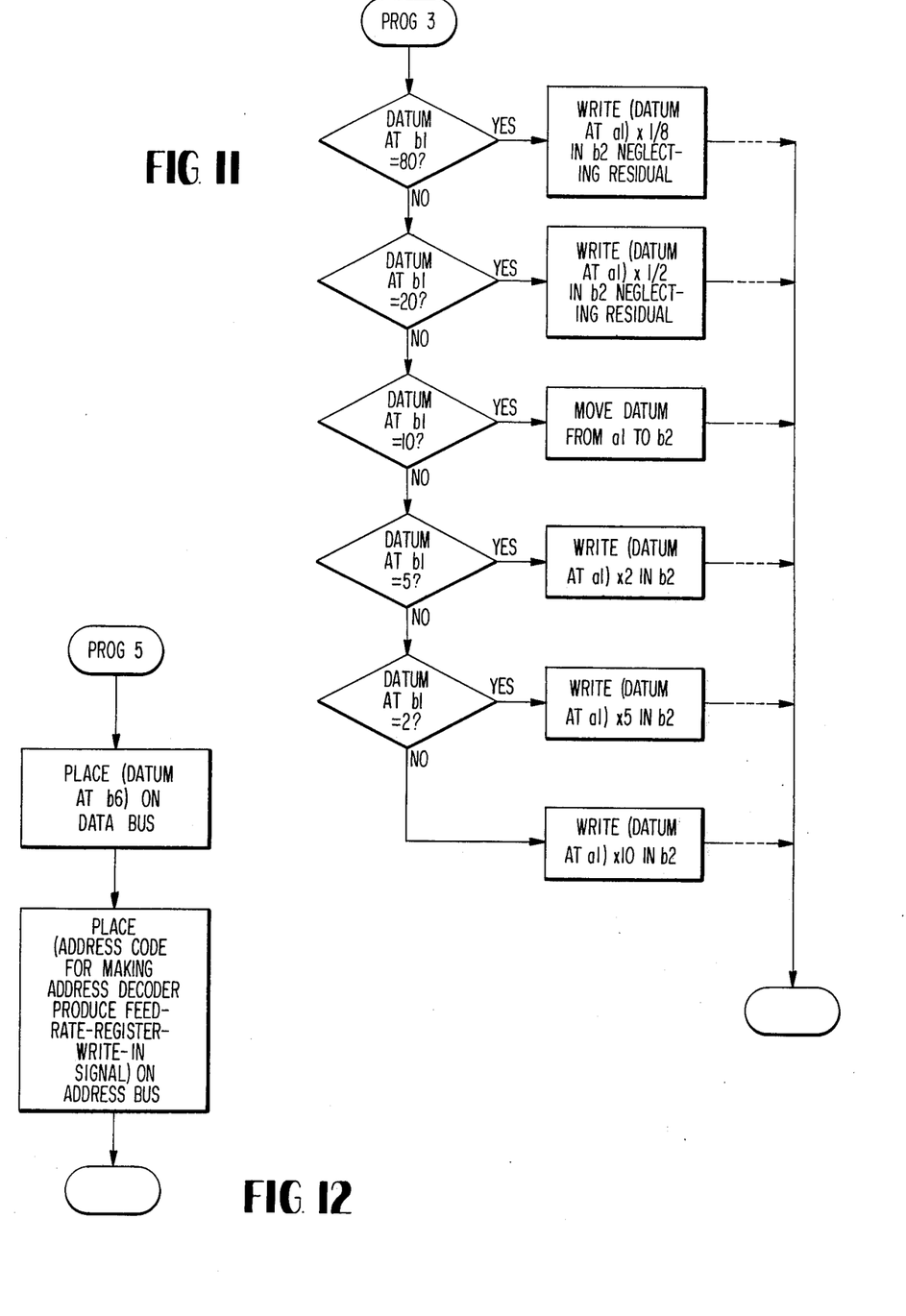

Referring once again to FIG. 8 and anew to FIG. 11, the central processor 50 carries out the preliminary processing program PROG3 with reference to the working step size D stored in the address b1. As described in the foregoing, the central processor 50 multiplies the X datum remaining in the address a1 by the multiple ⅛ or the like used in deriving the working step size D from the conventional step size and stores a working X position datum X' in the address b2 in compliance with a flow chart shown in FIG. 11. Thereafter, the central processor 50 similarly and successively deals with the Y, I, J, and F data remaining in the address a2 and stored in the addresses a3 through a5 to store a working Y position and working curvature and feed rate data Y', I', J', and F' in the addresses b3, b4, b5, and b6, respectively. When the multiplier is ⅛ or ½, the fractions, if any, for the curvature and feed rate data I, J, and F are discarded although the residual for the F datum has already been dealt with during the auxiliary pulse distribution with the conventional step size. It will be understood that working position, curvature, and feed rate signals are supplied to the memory 51 on storing the respective data X', Y', I', J', and F' in the addresses b2 through b6.

Referring now to FIGS. 8 and 12, the computer 40 comprises a feed rate register 61 and an input register 63 for receiving and supplying data signals from and to the data bus 53 in response to the write-in and read-out signals $e_f$ and $e_i$, respectively. The interpolator according to the first embodiment comprises a pulse oscillator 65 and a binary rate multiplier 67. The binary multiplier 67 is operatively coupled to the oscillator 65 and to the feed rate and the input registers 61 and 63 to produce feed rate pulses linearly proportionally to the data with which the feed rate register 61 is loaded to load, in turn, the input register 63 with the feed rate pulses one by one. These circuit elements per se are known in the art and so will not be described more in detail. Responsive to the feed rate program PROG5, the central processor 50 place the working feed rate signal for the F' datum on the data bus 53 and subsequently produces an address code for making the address decoder 56 produce the write-in signal $e_f$ to load the feed rate register 61 with the working feed rate datum F' as shown in a flow chart for the feed rate program PROG5 in FIG. 12.

Figure 13:
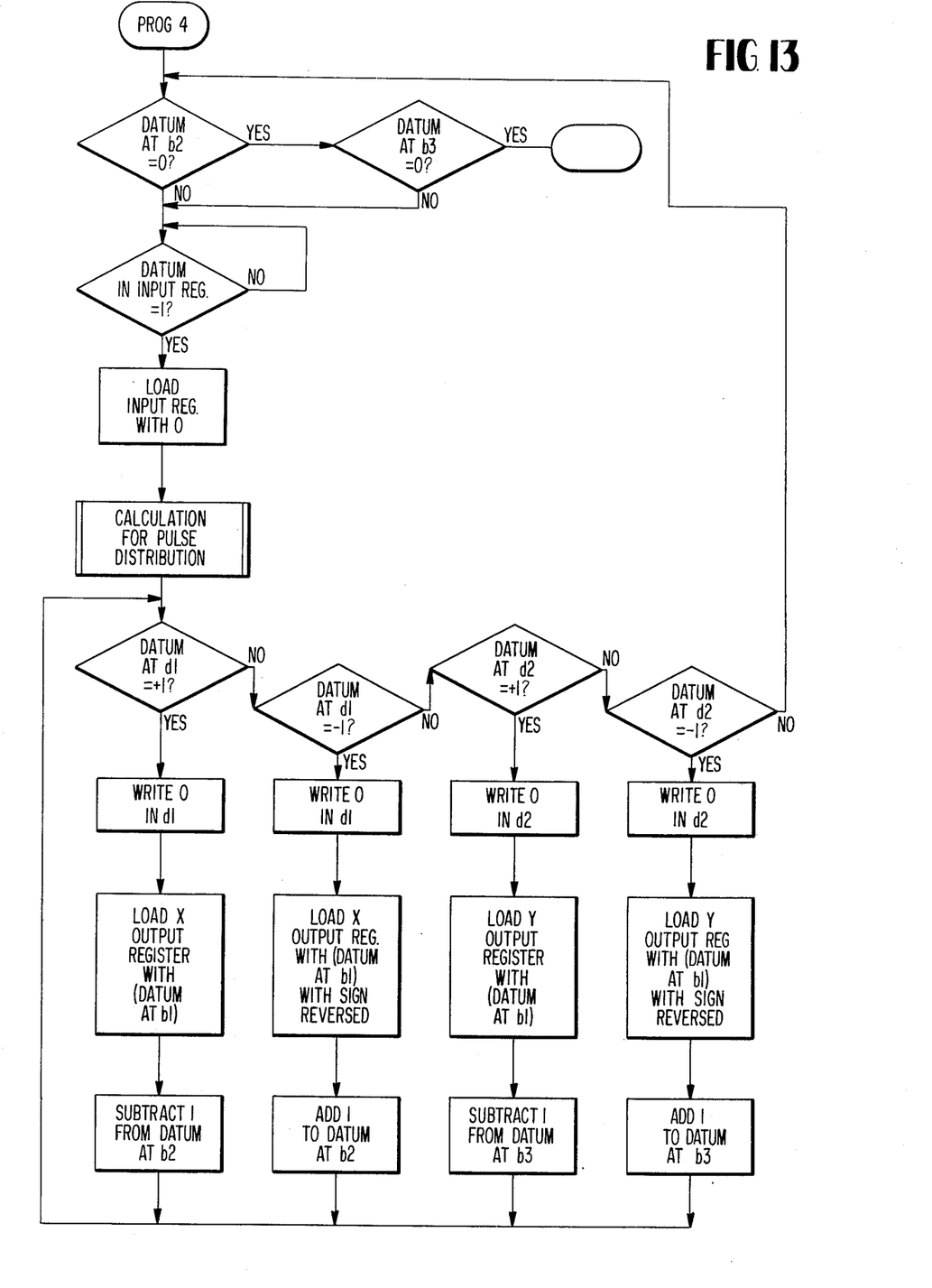

Next referring to FIGS. 8 and 13, the central processor 50 checks the working X position datum X' stored in the address b2. If the datum X' is zero, the processor 50 checks the working Y position datum Y'. If not zero, the processor 50 produces an address code for making the address decoder 56 produce the read-out signal $e_i$ to place that datum (a feed rate pulse) on the data bus 53 with which the input register 63 is loaded. If the processor 50 finds the datum placed on the data bus 53 to be zero, the cycle comes to an end. If not zero, the processor 50 carries out pulse distribution with reference to the working data X', Y', I', and J' stored in the addresses b2 through b4 to vary the pertinent one of the working position data X' and Y' by one. As the algorithm therefor, use may be made of that disclosed in U.S. Pat. No. 3,634,667. Let the result of the pulse distribution be a feed of one step in the plus or minus X sense. The processor 50 stores X pulse data of +1 and −1 in the address d1 according as the result is the feeds in the plus and minus X senses, respectively. According as the result of the pulse distribution is the feeds of one step in the plus and minus Y senses, the processor 50 stores Y pulse data of +1 and −1 in the address d2, respectively. Thereafter, the processor 50 checks the X pulse datum stored in the address d1. If the datum is +1 or −1, the processor 50 multiplies in effect the datum by the working step size D stored in the address b1 and loads the X output register 58 with the product that serves as the working X distribution datum. The processor 50 resets the address d1 to zero. If not, the processor 50 checks the Y pulse datum stored in the address d2 and loads the Y output register 59 with a working Y distribution datum. In response to the X or Y distribution datum, the X or Y servo 26 or 27 feeds the machine tool relative to the workpiece by one working step size D while resetting the relevant one of the X and Y output registers 58 and 59. The processor 50 reduces the absolute value of the working position datum X' or Y' by one for each instance of the pulse distribution until the working position data X' and Y' stored in the addresses b2 and b3 eventually become zero. Subsequently, the processor 50 again carries out the data store program for a set of block data for a next following block.

Figure 14:
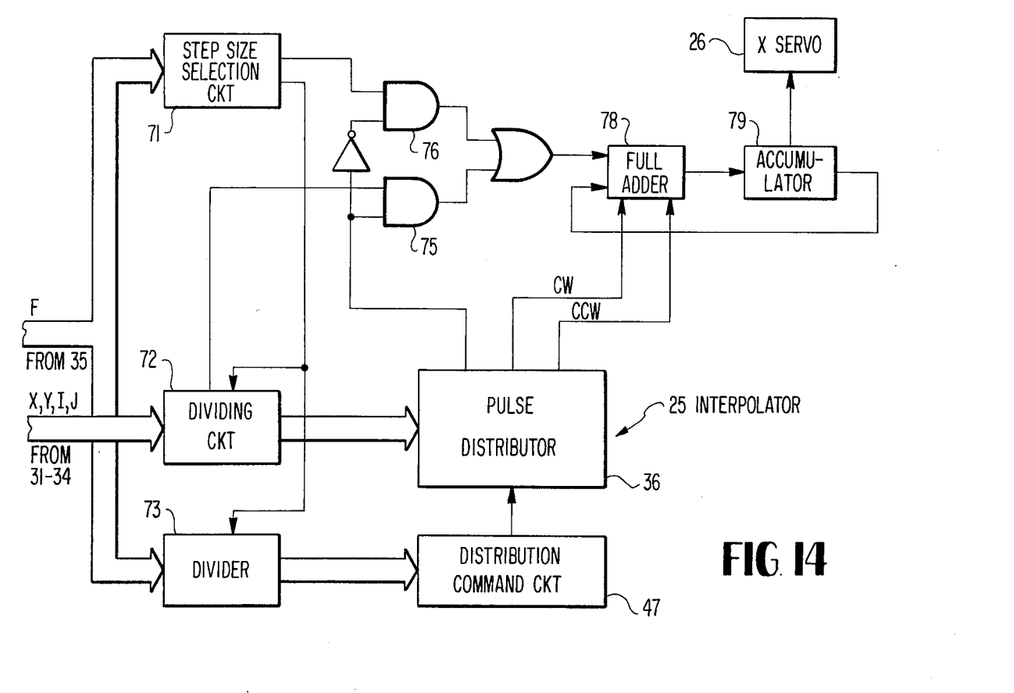
FIG. 14 is a block diagram of principal portions of a numerically controlled machine comprising an interpolator according to a second embodiment of this invention.

Turning to FIG. 14, an interpolator 25 according to a second embodiment of this invention comprises random logics (not shown) as is the case with the conventional one illustrated with reference to FIG. 6. Accordingly, the interpolator 25 comprises similar elements designated with like reference numerals as in FIG. 6. Additional hardware is, however, necessary. In response to a feed rate signal, a step size selection circuit 71 selects a working step size D to produce a step size signal. The circuit 71 further produces a multiplier signal representative of the ratio of the selected step size D to the conventional step size. The ratio is named a multiplier for the time being. Supplied with the multiplier signal and the displacement signals, a dividing circuit 72 divides the displacement data by the multiplier to supply the pulse distributor 36 with working signals that are representative of integral quotients derived by the division. The dividing circuit 72 retains the residual or residuals, if any, which appear when the position data X and Y are divided by the multiplier. Supplied with the multiplier and feed rate signals, a divider 73 divides the feed rate F by the multiplier to supply the distribution command unit or circuit 47 with a working feed rate signal representative of an integral quotient derived by the division. In order to deal with the residuals or fractions, the pulse distributor 36 produces a null signal indicative of the fact that the working position data X' and Y' have been used to produce the distribution signals CW and CCW to be all zero or null. The null signal is supplied to a fraction AND gate 75 together with a residual signal representative of the residual or residuals retained by the dividing circuit 72. The AND gate 75 produces a conventional step size signal representative of the conventional step size. During the pulse distribution normal for an interpolator according to this invention, a normal AND gate 76 allows the step size signal to pass therethrough. It is now preferred to substitute a combination of a full adder 78 and an accumulator 79 for the add/subtract counter 49 described in conjunction with FIG. 6. The step size signal and the distribution signals CW and CCW are supplied to the full adder 78 to renew the position data accumulated in the accumulator 79 by the working step size D. When the null signal is produced, the full adder 78 renews the position data by the conventional step size.

Figure 15:
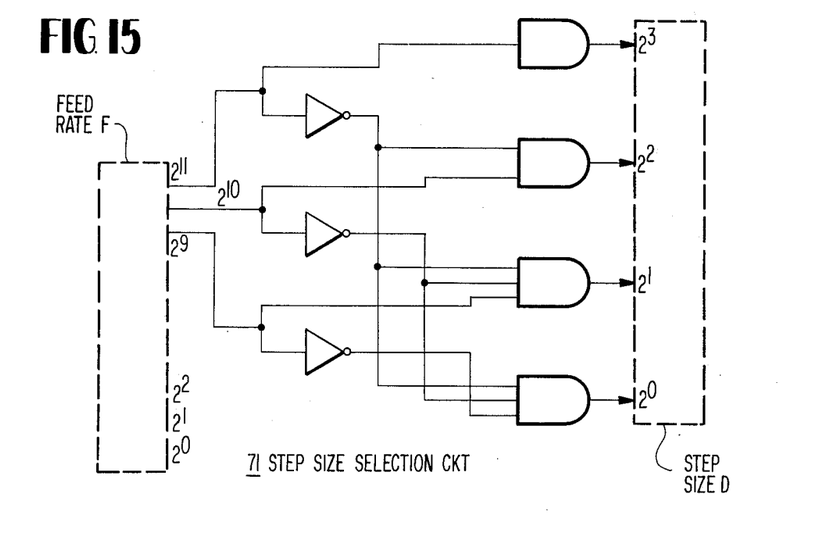
FIG. 15 is a block diagram of a step size selection circuit used in an interpolator according to the second embodiment.

Finally referring to FIG. 15, an example of the step size selection circuit 71 is for producing a step size signal in response to a feed rate signal. From the logics illustrated, it will readily be understood that the exemplified step size selection circuit 71 produces step size signals representative of working step sizes D of 8, 4, 2, and 1 micron when the three more significant digits $2^{11}$, $2^{10}$, and $2^9$ of a twelve-bit feed rate signal designate conventional feed rates of 4095–2048, 2047–1024, 1023–512, and 511–0 mm/min, respectively.

While this invention has thus far been described in conjunction with a few embodiments thereof and several modifications, it will be now easy for those skilled in the art to carry this invention into effect in various other ways. For example, the computer 40 used in an interpolator according to the first embodiment may be that installed in any computer center or the like and accessible through a data line. If the feed rate F for some previous block is valid for the present block and not included in the input data for the present block, the feed rate signal or the equivalent mentioned in the appended claims should be understood to be that for the previous block.

What is claimed is:

1. An interpolator responsive to a set of input signals for each block for successively producing a plurality of distribution signals for a numerically controlled machine, said input signals comprising a set of displacement signals and a feed rate signal, said displacement signals being representative of conventional displacement data specifying said each block in terms of a conventional step size, said feed rate signal being representative of a feed rate defining, in turn, a conventional pulse distribution rate, said distribution signals being representative of those commanded positions substantially along said each block which said numerically controlled machine should follow at said feed rate, wherein the improvement comprises:

step size means responsive to said feed rate signal for selecting a working step size to produce a step size signal representative of said working step size;

working data means responsive to said step size signal and said input signals for producing working signals representative of working displacement data and a working pulse distribution rate, the ratio of said working displacement data to said conventional displacement data and the ratio of said working pulse distribution rate to said conventional pulse distribution rate being substantially equal to the ratio of said conventional step size to said working step size; and pulse distribution means responsive to said working signals for producing said distribution signals at said working pulse distribution rate, said distribution signals being now representative of said commanded positions in terms of said working step size.

2. An interpolator as claimed in claim 1, said displacement signals comprising a set of conventional position signals representative of position data specifying a position of said each block in terms of said conventional step size and a set of conventional curvature signals representative of curvature data defining a curvature of said each block also in terms of said conventional step size, wherein:

said step size means selecting said working step size to be equal to a multiple of said conventional step size, said multiple being a positive integer when said feed rate is not smaller than a predetermined feed rate, said multiple being an inverse of a positive integer exclusive of unity when said feed rate is smaller than said predetermined feed rate;

said working data means comprises:

means responsive to said step size signal and said feed rate signal for dividing said conventional pulse distribution rate by said multiple to derive a first integral quotient with a first remainder and to produce a working distribution rate signal representative of said quotient and a first remainder signal representative of said remainder;

means responsive to said step size signal and said position signals for dividing said position data by said multiple to derive second integral quotients with second remainders, respectively, and to produce working position signals representative of said second quotients and second remainder signals representative of said second remainders; and means responsive to said step size signal and said curvature signals for dividing said curvature data by said multiple to derive third integral quotients, respectively, and to produce working curvature signals representative of said third quotients;

said pulse distribution means being responsive to said working distribution rate, position, and curvature signals for producing said distribution signals at said working pulse distribution rate and further responsive to said first and second remainder signals for producing additional distribution signals at said conventional pulse distribution rate, said additional distribution signals being representative of those of said commanded positions which are given in terms of said conventional step size.

3. An interpolator responsive to a set of input signals for each block for successively producing a plurality of distribution signals for a numerically controlled machine, said input signals comprising a set of displacement signals and a feed rate signal, said displacement signals being representative of conventional displacement data specifying said each block in terms of a conventional step size, said feed rate signal being representative of a feed rate defining, in turn, a conventional pulse distribution rate, said distribution signals being representative of those commanded positions substantially along said each block which said numerically controlled machine should follow at said feed rate, wherein the improvement comprises:

said input signals further comprising a step size signal representative of a working step size;

working data means responsive to said step size signal and said displacement and feed rate signals for producing working signals representative of working displacement data and a working pulse distribution rate, the ratio of said working displacement data to said conventional displacement data and the ratio of said working pulse distribution rate to said conventional pulse distribution rate being substantially equal to the ratio of said conventional step size to said working step size; and pulse distribution means responsive to said working signals for producing said distribution signals at said working pulse distribution rate, said distribution signals being now representative of said commanded positions in terms of said working step size.

4. An interpolator as claimed in claim 3, said displacement signals comprising a set of conventional position signals representative of position data specifying a position of said each block in terms of said conventional step size and a set of conventional curvature signals representative of curvature data defining a curvature of said each block also in terms of said conventional step size, wherein:

said working step size being preselected to be equal to a multiple of said conventional step size, said multiple being a positive integer when said feed rate is not smaller than a predetermined feed rate, said multiple being an inverse of a positive integer exclusive of unity when said feed rate is smaller than said predetermined feed rate;

said working data means comprises:

means responsive to said step size signal and said feed rate signal for dividing said conventional pulse distribution rate by said multiple to derive a fist integral quotient with a first remainder and to produce a working distribution rate signal representative of said quotient and a first remainder signal representative of said remainder;

means responsive to said step size signal and said position signals for dividing said position data by said multiple to derive second integral quotients with second remainders, respectively, and to produce working position signals representative of said second quotients and second remainder signals representative of said second remainders; and means responsive to said step size signal and said curvature signals for dividing said curvature data by said multiple to derive third integral quotients, respectively, and to produce working curvature signals representative of said third quotients;

said pulse distribution means being responsive to said working distribution rate, position, and curvature signals for producing said distribution signals at said working pulse distribution rate and further responsive to said first and second remainder signals for producing additional distribution signals at said conventional pulse distribution rate, said additional distribution signals being representative of those of said commanded positions which are given in terms of said conventional step size.

* * * * *

UNITED STATES PATENT AND TRADEMARK OFFICE
CERTIFICATE OF CORRECTION

PATENT NO. : 4,061,907
DATED : December 6, 1977
INVENTOR(S) : Kiyokazu OKAMOTO et al It is certified that error appears in the above–identified patent and that said Letters Patent are hereby corrected as shown below:

IN THE SPECIFICATION:

Column 3, line 26, - delete "date" insert -- data -- line 35, - after "X" delete "period" insert -- , --

Column 5, line 12, - delete "performances" insert -- performance --

Column 6, line 48, - delete "more" insert -- mere --

Column 8, line 5, - delete "central processor" insert -- processing -- line 7 , - delete "F'" insert -- distribution --

IN THE CLAIMS:

Column 13, line 13 - delete "fist" insert -- first --

Signed and Sealed this

Twenty-eighth Day of March 1978

[SEAL]

Attest:

RUTH C. MASON
Attesting Officer

LUTRELLE F. PARKER
Acting Commissioner of Patents and Trademarks